Feb. 23, 1932.   R. M. ELMORE   1,846,323
LITTER CLEARER FOR A FURROWING DEVICE

Filed April 14, 1930

INVENTOR.
ROSCOE M. ELMORE.

BY
Lockwood Lockwood Goldsmith & Galt
ATTORNEYS.

Patented Feb. 23, 1932

1,846,323

UNITED STATES PATENT OFFICE

ROSCOE M. ELMORE, OF COLFAX, INDIANA

LITTER CLEARER FOR A FURROWING DEVICE

Application filed April 14, 1930. Serial No. 444,013.

This invention relates to a litter device for plows.

The chief object of this invention is to provide a plow with an attachment which is arranged to collect litter ahead of the plow share and from the off side portion thereof and divert the same so that it will lie in the furrow and be covered when the plow has passed on.

The chief feature of the invention consists in providing a plow with an attachment of the aforesaid character, which includes a self cleaning non-clogging device that is arranged to collect and position the collected litter in predetermined relation to the plow so that in the subsequent furrow formation, said litter will be buried.

Another feature of the invention consists in the provision of a plurality of litter diverters for a multiple plow and the rotation of said diverters from a common source of power.

A further feature of the invention consists in the power rotation of the litter diverters independent of the plow traction per se.

The full nature of the invention will be understood from the accompanying drawings and the following description and claims:—

In the drawings, Fig. 1 is a side elevation of a multiple plow provided with the invention.

Figure 1:
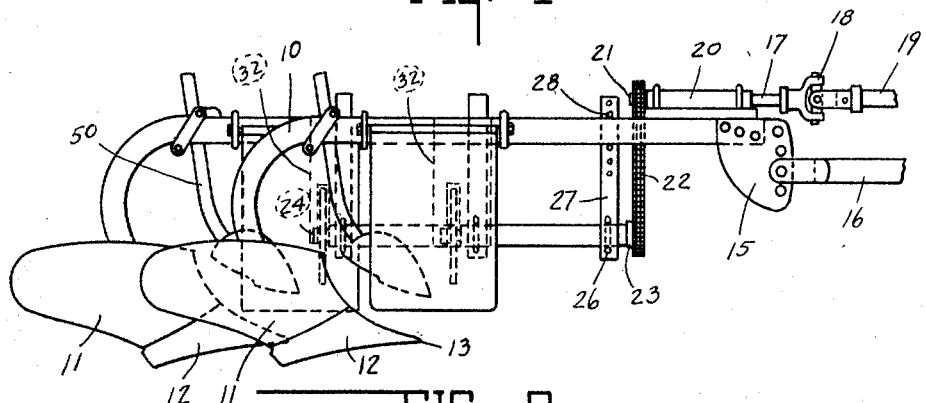

In the drawings, 10 indicates a plow beam, 11 the mold portion and 12 the share, 13 indicating the point. The line of draft is substantially parallel to the longitudinal direction of the beam.

Herein a pair of beams is illustrated and positioned in spaced relation and offset longitudinally, although they are connected at their forward end as by the frame construction 14. Frame construction 14 includes an adjustable plate or anchorage 15, by which the clevice or pull bar 16 is adjustably attached to the same for drawing the plow, preferably by a power device such as a tractor.

Suitably supported by the plate construction 14 is a power shaft 17 connected by a universal joint 18 to the power take-off shaft 19 of a tractor. Shaft 17 is enclosed in the combined bearing and housing structure 20 and at its opposite end 21, terminating in a sprocket wheel which is engaged by a chain 22. Chain 22 is adapted to drive a plurality of sprocket wheels 23, each supported by a shaft 24 mounted within a tube 25 supported in the clamping constructions 26, in turn supported by the straps 27 adjustably mounted as at 28 upon the beam.

The opposite end of the shaft 24 supports a rotating litter diverter, the axis of rotation being in substantial parallel alignment to the line of draft. The litter diverter includes a central hub member 29 carried by the shaft 24, said hub member supporting a plurality of radially and outwardly directed blades 30, the free ends of which turn rearwardly as at 31 in a direction opposite from the direction of rotation of the diverter.

The tubular support 25 for the shaft 24 prevents the litter, vines and the like from clogging the construction. Suitably supported by the plow beam is a bifurcated cleaner having the spaced tine portions 32 and the anchoring portion 33. In the rotation of the blades or fingers of the diverter, the same pass through the spacing between the tines and the trash that is carried with the diverter is automatically removed from the diverter arms and is deposited upon the ground immediately in front of and in alignment with the plow share.

In order to prevent the diverter from throwing the litter too far from the proposed furrow, a shield is provided and the same includes an offset supporting portion 34 and a depending hinged portion 35, hinged at 36. The litter that is collected and discharged by the diverter engages the shield which is open at both ends in parallel relation to the line of draft and the litter is deposited on the ground in alignment with the plow share and forwardly thereof so that in the subsequent formation of the furrow, the said litter is buried.

Figure 2:
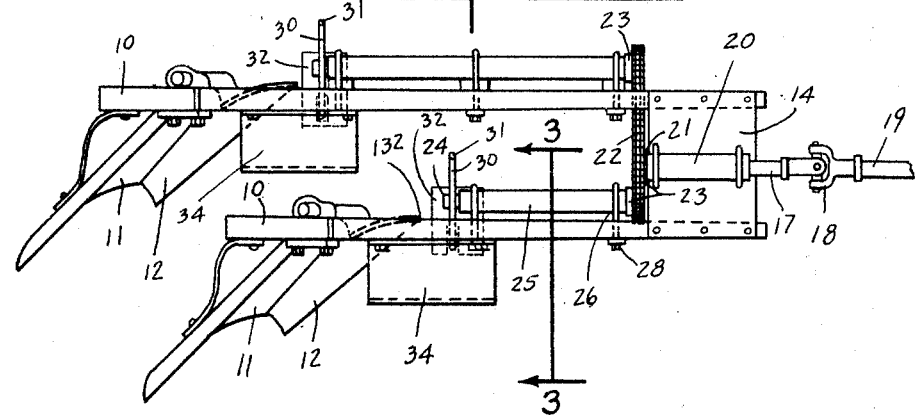
Fig. 2 is a top plan view thereof.
Figure 3:
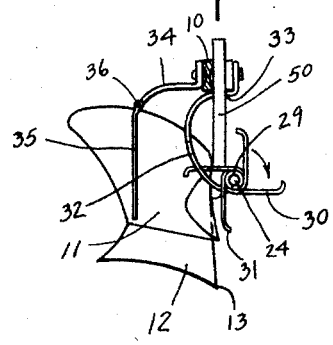
Fig. 3 is a front view of a portion of the plow, and the litter diverter, parts being shown in section, the view being taken in the plane of line 3—3 of Fig. 2 and in the direction of the arrows.

As shown clearly in Figs. 1 and 2, the ground to the off side of the plow, and what normally would be left between the shares, is cleared of the trash and litter and the same is directed toward the proposed furrow and is covered in the formation thereof.

If desired, there is nothing to prevent the installation of jointers and herein the same are indicated at 50 in the form of jointer plows and the said jointer plows are interposed between the plow and the litter diverter. By the employment of a relatively independent source of power, the diverter will operate independent of the speed of the plow.

Depositing the litter and turning it under covers the litter with a sufficent amount of soil so that it will decay with a limited supply of air and thus create a mulch, enrich the ground and increase its moisture holding power, and also increase its heat absorbing power.

The invention claimed is:

1. The combination with a plow beam, share and mold board, of a rotating bladed arm litter diverter positioned forwardly of the share point and arranged to collect litter ahead of the plow and to the off side thereof and divert the same to the furrow side, the axis of rotation of said litter diverter being substantially parallel to the line of draft, and a shield supported in juxtaposition to the diverter for collecting and guiding the diverted litter into predetermined alignment relative to the subsequently formed furrow.

2. The combination with a plow beam, share and mold board, of a rotating bladed arm litter diverter positioned forwardly of the share point and arranged to collect litter ahead of the plow and to the off side thereof and divert the same to the furrow side, the axis of rotation of said litter diverter being substantially parallel to the line of draft, and bifurcated means in juxtaposition to the path of the arms of the litter diverter and arranged to remove litter therefrom after the diverter arms have passed the normal diverting position.

3. The combination with a plow beam, share and mold board, of a rotating bladed arm litter diverter positioned forwardly of the share point and arranged to collect litter ahead of the plow and to the off side thereof and divert the same to the furrow side, the axis of rotation of said litter diverter being substantially parallel to the line of draft, bifurcated means in juxtaposition to the path of the arms of the litter diverter and arranged to remove litter therefrom after the diverter arms have passed the normal diverting position, and a shield supported in juxtaposition to the diverter for collecting and guiding the diverted litter into predetermined aligned relation to the subsequently formed furrow.

4. In a multiple plow, the combination with a plurality of spaced beams, a share and a mold board supported by each beam, of a single rotative power means independent of plow traction per se and supported by the multiple plow, a bladed arm litter diverter rotatable and dependently supported by each beam ahead of the share and having its axis of rotation parallel to the line of travel and substantially coincident with the plane coincident or parallel to the line of travel and including the plow point and arranged to divert litter and the like into alignment with the subsequently formed furrow, and means connecting each diverter to said single rotative means for simultaneously rotating all of the diverters.

5. A device as defined by claim 4, characterized by the diverter power means connection, comprising a single endless power transmitting means operatively associated with each diverter.

In witness whereof, I have hereunto affixed my signature.

ROSCOE M. ELMORE.